(12) United States Patent
Witham et al.

(10) Patent No.: US 9,328,279 B2
(45) Date of Patent: May 3, 2016

(54) MONO-QUATERNARY AMINE ALCOHOLS FOR USE OF CLAY AND SHALE INHIBITION AGENTS FOR THE DRILLING INDUSTRY

(71) Applicant: Dow Global Technologies LLC, Midland, MI (US)

(72) Inventors: Cole A. Witham, Pearland, TX (US); Joseph L. Deavenport, Lake Jackson, TX (US); Michael K. Poindexter, Sugar Land, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 14/414,917

(22) PCT Filed: Jul. 16, 2013

(86) PCT No.: PCT/US2013/050641
§ 371 (c)(1),
(2) Date: Jan. 15, 2015

(87) PCT Pub. No.: WO2014/014886
PCT Pub. Date: Jan. 23, 2014

(65) Prior Publication Data
US 2015/0166868 A1    Jun. 18, 2015

Related U.S. Application Data

(60) Provisional application No. 61/672,985, filed on Jul. 18, 2012.

(51) Int. Cl.
*C09K 8/22* (2006.01)
*C09K 8/52* (2006.01)

(52) U.S. Cl.
CPC ... *C09K 8/22* (2013.01); *C09K 8/52* (2013.01); *C09K 2208/12* (2013.01)

(58) Field of Classification Search
CPC ...... C09K 8/68; C09K 2208/30; C09K 8/602; C09K 2208/22; C09K 8/12; C09K 8/604; C09K 8/035; C09K 2208/20; C09K 8/426; C09K 8/508; C09K 8/516; C09K 8/52; C09K 8/524; C09K 8/528; C09K 8/54; C09K 8/74; C09K 8/76; C09K 8/80; C09K 8/882; C09K 2208/28; C09K 8/10; C09K 8/24; C09K 8/5083; C09K 8/514; C09K 8/588; C09K 8/594; C09K 8/62; E21B 43/08; E21B 23/01; E21B 23/06; E21B 33/01; E21B 33/129; E21B 36/00; E21B 36/04; E21B 37/06; E21B 43/00; E21B 43/04; E21B 43/088; E21B 43/10; E21B 43/108; E21B 43/12; E21B 43/16; E21B 43/26; E21B 43/267; Y10S 507/935
See application file for complete search history.

(56) References Cited

U.S. PATENT DOCUMENTS

| | | | |
|---|---|---|---|
| 4,605,068 A | 8/1986 | Young et al. | |
| 4,664,818 A | 5/1987 | Halliday et al. | |
| 5,097,904 A * | 3/1992 | Himes | C09K 8/607 166/294 |
| 5,197,544 A | 3/1993 | Himes | |
| 5,380,706 A * | 1/1995 | Himes | C09K 8/22 507/129 |
| 5,728,653 A | 3/1998 | Audibert et al. | |
| 5,771,971 A | 6/1998 | Horton et al. | |
| 5,887,653 A * | 3/1999 | Bishop | C09K 8/58 106/900 |
| 5,908,814 A | 6/1999 | Patel et al. | |
| 6,247,543 B1 | 6/2001 | Patel et al. | |
| 6,484,821 B1 | 11/2002 | Patel et al. | |
| 6,544,933 B1 | 4/2003 | Reid et al. | |
| 6,609,578 B2 | 8/2003 | Patel et al. | |
| 7,091,159 B2 | 8/2006 | Eoff et al. | |
| 2002/0155956 A1 | 10/2002 | Chamberlain et al. | |
| 2003/0106718 A1 | 6/2003 | Patel et al. | |
| 2008/0039345 A1* | 2/2008 | Kippie | C09K 8/12 507/119 |

FOREIGN PATENT DOCUMENTS

| WO | WO 2006/013595 | 2/2006 |
|---|---|---|
| WO | WO 2006/013596 | 2/2006 |
| WO | WO 2006/013597 | 2/2006 |

* cited by examiner

*Primary Examiner* — Susannah Chung
*Assistant Examiner* — Kumar R Bhushan

(57) ABSTRACT

The hydration of clays and shale in drilling operations may be inhibited by employing an aqueous based drilling fluid comprising a shale hydration inhibition agent having the formula wherein R is an alkyl group having 1 to 6 carbons, $R_1$ is an alkyl group having 1 to 18 carbons, and X is an anion. The shale hydration inhibition agent should be present in the aqueous based drilling fluid in sufficient concentration to reduce the reactivity, such as swelling, of clays and shale when exposed to water-based drilling fluids.

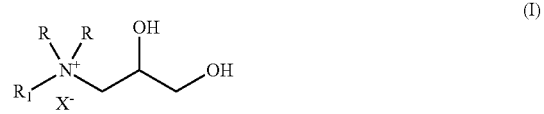

(I)

10 Claims, No Drawings

MONO-QUATERNARY AMINE ALCOHOLS FOR USE OF CLAY AND SHALE INHIBITION AGENTS FOR THE DRILLING INDUSTRY

FIELD OF THE INVENTION

The present invention relates to shale hydration inhibition agents for the drilling industry, specifically mono-quaternary amine alcohol compounds which are effective for the reduction of reactivity, for example the inhibition of swelling, of clay and shale which comes into contact with the fluids used in the drilling and construction of oil and gas wells for the petroleum industry.

BACKGROUND OF THE INVENTION

In the rotary drilling of wells a drilling fluid circulates throughout the underground well to carry cuttings from the bit and to transport these cuttings to the surface. Contemporaneously, the drilling fluid cools and cleans the drill bit, as well as reduces friction between drill string and the drilled hole, and also stabilizes uncased sections of the well. Usually drilling fluids form a low permeability filter cake in order to seal any permeability associated with the surrounding geological formations.

Drilling fluids may be classified according to their fluid base: oil based fluids with solid particles suspended in an oil continuous phase and, possibly, water or brine may be emulsified with the oil. Alternatively, water based fluids contain solid particles suspended in water or brine. Various solids may be added, deliberately or otherwise, to water based drilling fluids: a) organic polymers or clays used to impart viscosity and filtration properties; b) insoluble inorganic minerals to increase the fluid density as well as help decrease fluid loss; c) soluble salts used to increase the mud's density; and d) during the drilling operation formation solids may disperse into the drilling fluid.

Formation solids that become dispersed in a drilling fluid include cuttings from drilling, soil, and solids from surrounding unstable formation. When the formation yields solids that are clay minerals which are reactive, for example swell, disperse, migrate or undergo swelling-induced migration, this can potentially compromise drilling time and increase costs.

Clays are typically composed of sheets or layers of aluminosilicate minerals having exposed surface hydroxyls. The basal plane of the clay surface is negatively charged and as such cations are readily adsorbed onto the surface. These cations may be exchangeable. Substitutions within the clay structure and the presence of exchangeable cations affect the tendency of the clay to swell in water. For example surface hydration gives swelling with water molecules adsorbed on clay surfaces. Many types of clays can swell in this manner.

Another type of swelling is called osmotic swelling, when interlayer ion concentration leaches water between the clay unit layers, swelling the clay. Only some clays can undergo osmotic swelling. All types of clay and shale instability, such as swelling, can cause a series of problems. For example, drag between the drill string and the sides of the borehole may be increased. This can cause loss of fluid circulation and sticking of the drill string and bit.

This is why development of effective clay instability inhibitors is important to the oil and gas exploration industry. The present invention works towards a solution to these difficulties.

Many types of clay inhibitors are known including the use of inorganic salts such as potassium chloride. Numerous patents have been filed which describe techniques or products which can be used to inhibit clay swelling. Without completely summarizing the patent literature, and by way of example, we can cite the inhibitor compositions based on: a) inorganic phosphates, described in U.S. Pat. No. 4,605,068; b) polyalkoxy diamines and their salts, in U.S. Pat. Nos. 6,484,821; 6,609,578; 6,247,543; and U.S. 20030106718; c) choline derivatives described in U.S. Pat. No. 5,908,814; d) oligomethylene diamines and their salts, in U.S. Pat. No. 5,771,971 and U.S. Publication No. 20020155956; e) the addition product of carboxymethyl cellulose and an organic amine, in WO 2006/013595; f) 1,2-cyclohexanediamine and/or their salts, in WO 2006/013597; g) salts of phosphoric acid esters of oxyalkylated polyols, in WO 2006/013596; h) the combination of a partially hydrolyzed acrylic copolymer, potassium chloride and polyanionic cellulose, in U.S. Pat. No. 4,664,818; i) quaternary ammonium compounds, in U.S. Pat. Nos. 5,197,544 and 5,380,706; j) polymers based on dialkyl aminoalkyl methacrylate, in U.S. Pat. No. 7,091,159; k) aqueous solutions containing a polymer with hydrophilic and hydrophobic groups, in U.S. Pat. No. 5,728,653; and l) the reaction product of a polyhydroxyalkane and an alkylene oxide, in U.S. Pat. No. 6,544,933.

SUMMARY OF THE INVENTION

The present invention is an aqueous based drilling fluid composition and method of using said aqueous based drilling fluid composition for reducing the reactivity such as swelling of clays and shale in drilling operations wherein the aqueous based drilling fluid comprises an aqueous based continuous phase, a reactive clay or shale material, and a shale hydration inhibition agent comprising a mono-quaternary amine alcohol compound having the following formula:

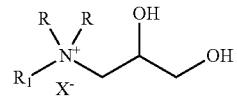

wherein
R is an alkyl group having 1 to 6 carbons, preferably methyl;
$R_1$ is an alkyl group having 1 to 18 carbons, preferably an alkyl group having 1 to 12 carbons, more preferably an alkyl group having 2 to 10 carbons, and more preferably an alkyl group having 4 to 8 carbons; and
X is an anion, preferably a halide, sulfate, phosphate, carbonate, or hydroxide ion, most preferably chloride.

Preferably, the shale hydration inhibition compound of the present invention is 2,3-dihydroxypropylbutyldimethylammonium chloride; 2,3-dihydroxypropylpentyldimethylammonium chloride; 2,3-dihydroxypropylhexyldimethylammonium chloride; 2,3-dihydroxypropylheptyldimethylammonium chloride; 2,3-dihydroxypropyloctyldimethylammonium chloride; 2,3-dihydroxypropyldodecyldimethylammonium chloride; and 2,3-dihydroxypropyltrimethylammonium chloride.

The aqueous based drilling fluid described herein above may optionally further comprise one or more of a fluid loss control agent, a weighting material, a viscosifying agent, a dispersant, a lubricant, a corrosion inhibitor, a defoamer, salts, or a surfactant.

The aqueous phase of the aqueous based drilling fluid described herein above preferably is fresh water, sea water, brine, mixtures of water and water soluble organic compounds, or mixtures thereof.

DETAILED DESCRIPTION OF THE INVENTION

The present invention is directed to a water-based drilling fluid for use in drilling wells through a formation containing a clay or shale which is unstable (sometimes referred to as reactive clay or shale material) and for example may swell, in the presence of water. Generally the drilling fluid of the present invention includes a shale hydration inhibition agent and an aqueous continuous phase. As disclosed below, the drilling fluids of the present invention may also include additional components, such as a weight material, fluid loss control agents, bridging agents, lubricants, anti-bit balling agents, corrosion inhibition agents, salts, surfactants and suspending agents and the like which may be added to an aqueous based drilling fluid.

During the drilling of wells, a drilling fluid is circulated down the drill string, through the drill bit and back to the surface for reconditioning and reuse. The drilling fluid suspends the drill cuttings originating from the drilling process and transports the cuttings to the surface. At the same time the drilling fluid cools and cleans the drill bit, reduces the friction between the drill pipe and the borehole walls and stabilizes the sections of the well that are prone to collapse.

Normally the drilling fluids form a filter cake of low permeability which prevents leaking into the surrounding geological formations and avoids excessive losses of the liquid phase of the drilling fluid itself. Drilling fluids can be classified according to the nature of their continuous liquid phase. There are oil-based drilling fluids, sometimes referred to as oil-based muds (OBM), in which the solids are suspended in a continuous oleaginous phase and optionally water or a brine phase is emulsified into the oleaginous phase. Alternatively, water-based drilling fluids, sometimes referred to as water-based muds (WBM), contain solids suspended in water or brine or solutions of silicates.

Various chemicals can be added, deliberately or not, to water-based drilling fluids: A) organic polymers or clays, used to impart viscosity and fluid loss reduction; B) insoluble inorganic minerals to increase the fluid density; and/or C) solids that originate from the drilling process. The solids, which disperse into the fluid, include cuttings from the drilling operation and from the unstable geological surrounding formations.

When the drilling operation encounters swellable or reactive clay-like materials, they can compromise drilling time and increase costs. There are different kinds of clays and shale that swell, disperse, and/or migrate and they can cause numerous operational problems. For the purposes of this application, the term "clay" is defined as a variety of phyllosilicate minerals rich in silicon and aluminum oxides and hydroxides which include variable amounts of structural water, illustratively including kaolinite, bentonite, dickite, halloysite, chrysotile, lizardite, amesite, talc, montmorillonite, beidellite, saponite, hectorite, sauconite, vermiculite, muscovite, paragonite, phlogopite, biotite, lepidolite, margarite, clintonite, anandite, donbassite, cookeite, sudoite, clinoclilore, chamosite, nimite, hydrotalcite, meixnerite, stevensite, nontronite, nacrite, hydrobiotite, glauconite, illite, bramallite, chlorite, attapulgite and sepiolite. The clay content of the formations can be comprised substantially of a single species of clay mineral, or of several species, including the mixed layer types of clay.

Also, for the purposes of this application, the term "shale" is defined to mean a fine-grained sedimentary rock formed by the consolidation of clay, silt, or mud. It is characterized by a finely laminated structure which imparts fissures parallel to the bedding along which the rock may easily break. As used herein, the term "shale" is also defined to mean materials that may "swell" or increase in volume or disperse or migrate, when exposed to water. Reactive shale may be problematic during drilling operations because of, inter alia, their tendency to degrade when exposed to aqueous media such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the well-bore until such time as the cuttings can be removed by solids control equipment located at the surface.

Further, for the purpose of this application, the term "shale hydration inhibition agent" refers to an agent that positively affects (e.g., reduces) the reactivity of a reactive clay or shale by reducing one or more of the amount of swelling, dispersing, migration, swelling-induced migration, and the like when in the presence of water.

The swelling increases the friction between the drill pipe and the borehole walls, causes drilling fluid losses and sticking between the drill pipe and the borehole walls. Other forms of shale instability, such as dispersing, migration, swelling-induced migration, and the like, further adversely impact drilling operations. For this reason the development of swelling inhibitors for clays and shale is important for the oil and gas industry. The invention works in this direction to solve these problems.

It has now been found that suitable mono-quaternary amine alcohol compounds perform effectively as shale hydration inhibition agents to positively affect the reactivity of clay and/or shale. Quaternary amine alcohol compounds and methods to make said compounds are well known, for example see WO 2008/058111 and U.S. Pat. Nos. 7,541,496 and 6,177,577, both of which are incorporated by reference herein in its entirety. Water-based drilling fluids comprising the shale hydration inhibition agent of the present invention have been revealed to be excellent shale hydration inhibitors for the petroleum industry, being able to effectively inhibit clay and shale swelling in drilling processes and subterranean formations. Shale hydration inhibition agents of the present invention are mono-quaternary amine alcohol compounds having the following formula:

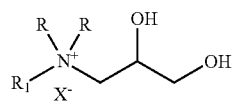

wherein
R is an alkyl group having 1 to 6 carbons, preferably an alkyl group having 1, 2, 3, 4, 5, or 6 carbons, more preferably methyl;
$R_1$ is an alkyl group having 1 to 18 carbons, more preferably an alkyl group having 1, 2, 3, 4, 5, 6, 7, 8, 9, 10, 11, 12, 13, 14, 15, 16, 17, or 18 carbons, more preferably an alkyl group having 2 to 10 carbons, more preferably an alkyl group having 4 to 8 carbons; and
X is an anion, preferably a halide, sulfate, phosphate, carbonate, or hydroxide anion, most preferably chloride.

Preferably, the shale hydration inhibition compound of the present invention is 2,3-dihydroxypropylbutyldimethylammonium chloride; 2,3-dihydroxypropylpentyldimethylammonium chloride; 2,3-dihydroxypropylhexyldimethylammonium chloride; 2,3-dihydroxypropylheptyldimethylammonium chloride; 2,3- dihydroxypropyloctyldimethylammonium chloride; 2,3-dihydroxypropyldodecyldimethylammonium chloride; and 2,3-dihydroxypropyltrimethylammonium chloride.

The shale hydration inhibition agent should be present in sufficient concentration to reduce either or both the surface hydration based swelling and/or the osmotic based swelling of the clay or shale. The exact amount of the shale hydration inhibition agent present in a particular drilling fluid formulation can be determined by a trial and error method of testing the combination of drilling fluid and shale formation encountered. Generally however, the shale hydration inhibition agent of the present invention may be used in drilling fluids in a concentration from about 1 to about 18 pounds per barrel (lbs/bbl or ppb) and more preferably in a concentration from about 2 to about 12 pounds per barrel of drilling fluid.

The aqueous based drilling mud contains an aqueous based continuous phase and may contain one or more of normally used additives well known by those skilled in the art, such as fluid loss control agents, weighting materials, viscosifying agents, dispersants, lubricants, corrosion inhibitors, defoamers and surfactants. Useful fluid loss control agents are organic polymers, starches, and mixtures thereof. Useful weighting materials may be selected from: barite, hematite, iron oxide, calcium carbonate, magnesium carbonate, magnesium organic and inorganic salts, calcium chloride, calcium bromide, magnesium chloride, zinc halides, alkali metal formates, alkali metal nitrates and combinations thereof.

The aqueous based continuous phase may generally be any water based fluid phase that is compatible with the formulation of a drilling fluid and is compatible with the shale hydration inhibition agents disclosed herein. In one preferred embodiment, the aqueous based continuous phase is selected from: fresh water, sea water, brine, mixtures of water and water soluble organic compounds, and mixtures thereof. The amount of the aqueous based continuous phase should be sufficient to form a water based drilling fluid. This amount may range from nearly 100 percent of the drilling fluid to less than 30 percent of the drilling fluid by volume. Preferably, the aqueous based continuous phase is from about 95 percent to about 30 percent by volume and preferably from about 90 percent to about 40 percent by volume of the drilling fluid.

EXAMPLES

Synthesis of Mono-Quaternary Amine Alcohols

Example 1

2,3-Dihydroxypropylbutyldimethylammonium chloride: In a 2 L reactor system 543.27 g of 3-chloro-1,2-dihydroxypropane (99.6%, 4.90 moles) is added to 721.03 g of distilled water. The solution is brought to 25° C. Over 45 minutes 479.54 g dimethylbutylamine (99.5%, 4.72 moles) is added to the reactor. After one hour of mixing the temperature is increased to 40° C. and held for one hour. The temperature is then increased to 50° C. and held for 2.5 hours. The temperature is then increased to 60° C. and held for one hour. External heating is turned off and the reaction solution is allowed to stir overnight (16 hours). The pH is then increased to 10.6 by adding 3.52 g sodium hydroxide (50%) and the temperature is increased to 40° C. After 30 minutes, 2.89 g sodium hydroxide (50%) is added to increase the pH from 9.9 to 10.7. After 30 additional minutes, 2.96 g of sodium hydroxide (50%) is added to increase the pH from 9.4 to 10.7. 6.84 g of 3-chloro-1,2-dihydroxypropane is then added and the solution is allowed to stir at room temperature for 60 hours. 11.39 g of trimethylamine (43.6%) and 1.80 g sodium hydroxide (50%) is then added. The solution is allowed to stir overnight (16 hours) at room temperature. The solution was then heated to 40° C. and purged with nitrogen to remove the excess trimethylamine. The solution is cooled to room temperature, the pH was adjusted to 6.9 and it is filtered through Whatman 42 filter paper. The isolated product has the following structure:

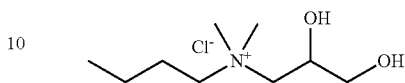

with the following $^{13}$C NMR spectra acquired from a Bruker 300 MHz spectrometer (samples prepared as ~30 wt % in $D_2O$): DEPT NMR (250 MHz, $D_2O$) 15.4, 21.7, 26.6, (54.1, 54.4), 66.3, 68.2, 68.7.

Example 2

2,3-Dihydroxypropyloctyldimethylammonium chloride: In a 2 L reactor system 358.81 g of 3-chloro-1,2-dihydroxypropane (99.3%, 3.22 moles) is added to 734.20 g distilled water. The solution is heated to 30° C. and 496.29 g dimethyloctylamine (98.5%, 3.11 moles) is added over 60 minutes while the reaction solution is being mixed with a mechanical stirrer. The pH is 8.9 and 3.83 g sodium hydroxide (50%) is added to increase the pH to 9.9. The reaction solution is mixed for one hour and then the temperature is increased to 50° C. After another hour the reaction solution is a "milky white" and the pH is 8.3. 19.6 g sodium hydroxide (50%) is added to increase the pH to 9.5. After four additional hours of mixing at 50° C. the pH is 11.7; 11.97 g concentrated hydrochloric acid is added to decrease the pH to 9.0. Thirty minutes later 3.30 g of concentrated hydrochloric acid is added to decrease the pH to 8.9. The solution is allowed to stir for 16 hours at 50° C. The reaction solution pH is 10.7 and 2.58 g concentrated hydrochloric acid is added to reduce the pH to 8.0. The temperature is reduced to 20° C. and 24.23 g trimethylamine (43.6%) is added and allowed to mix at room temperature for five hours. The temperature is increased to 40° C. and the pH is increased to 9.5 and the reaction solution is purged with nitrogen overnight. The solution is pH adjusted to 6.5 with concentrated hydrochloric acid. The isolated product has the following structure:

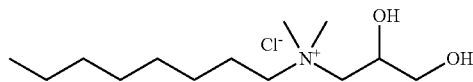 [SMILES: CCCCCCCC[N+](C)(C)CC(O)CO ; [Cl-]]

with the following $^{13}$C NMR spectra acquired from a Bruker 300 MHz spectrometer (samples prepared as ~30 wt % in $D_2O$): DEPT NMR (250 MHz, $D_2O$) 15.8, 24.2, 24.3, 27.8, 30.6, 33.3, (53.7, 53.9), 65.8, 67.8, 68.3.

Example 3

Synthesis of 2,3-Dihydroxypropyldodecyldimethylammonium chloride: In a 2 L reactor system 638.06 g of dimethyldodecyl amine (97.6%, 2.92 moles) is added to 603.91 g distilled water. The solution is heated to 30° C. and 21.21 g sodium hydroxide (50%) is added. Over 30 minutes 353.49 g 3-chloro-1,2-dihydroxypropane (99.3%, 3.18 moles) is added while the reaction solution is being mixed with a mechanical stirrer. The reaction solution is mixed at 30° C. for 90 minutes and then the temperature is gradually increased to 40° C. over 45 minutes. The temperature is then increased over the next hour to 55° C. The solution turned from a semi-opaque white to clear. The solution is held at 55° C. for two hours; after one hour the solution is getting more viscous so 135.48 g distilled water is added. The solution is allowed to cool to room temperature and stirred overnight. The solution had become too viscous for the stirrer to operate so 150.59 g distilled water is added and the temperature is increased to 45° C. The solution is allowed to cool to room temperature and 46.59 g trimethylamine (43.6%) is added and mixed for two hours. The solution is allowed to stand without mixing or heating for 60 hours. The solution is then heated to 40° C. and the pH is adjusted to 10 and purged with nitrogen until the residual trimethylamine hydrochloride is less than 20 ppm. The pH is then decreased to 6.5 with concentrated hydrochloric acid. The isolated product has the following structure:

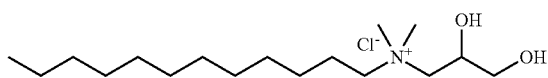 [SMILES: CCCCCCCCCCCC[N+](C)(C)CC(O)CO ; [Cl-]]

with the following $^{13}$C NMR spectra acquired from a Bruker 300 MHz spectrometer (samples prepared as ~30 wt % in $D_2O$): DEPT NMR (250 MHz, $D_2O$) 15.7, 24.4, 24.5, 28.2, 31.2, 31.5, 31.8, 31.9, 33.9, 53.6, 65.6, 67.3, 67.8, 68.0.

Example 4

Synthesis of 2,3-dihydroxypropyltrimethylammonium chloride: To 251 mL of 3-chloro-1,2-dihydroxypropane is added to a round bottom flask equipped with a stir bar, thermometer, and condenser. 837 mL of 25% aqueous trimethylamine is added to the reactor while stirring. The solution is allowed to stir for 16 hours at 15° C. The solution is sparged with nitrogen for six days during which time the pH decreases from about 11 to about 6. The solution is placed under reduced pressure of approximately 25 inches Hg for 24 hours at 65° C. The solution is then placed under reduced pressure of 30 inches of Hg for eight hours at 65° C. 200 mL of isopropanol is added to the solution and the product crystallizes. The product is filtered and placed in a nitrogen dry box for 24 hours and then in a vacuum oven at about 60° C. and at reduced pressure of 26 inches of Hg with a nitrogen sweep for 36 hours. The product is placed in a nitrogen dry box for 24 hours. The product is analyzed for trimethylamine via GC headspace analysis and 3.2 ppm trimethylamine is found. Analysis by HPLC showed 100.0% purity of the 2,3-dihydroxyropyltrimethylammonium chloride. The isolated product has the following structure:

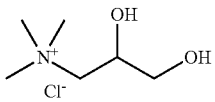

Shale Inhibition Tests

Examples 5 to 8 are mono-quaternary amine alcohol shale inhibitors (Examples 1 to 4) of the present invention tested on a base sample of mud material. The base sample of mud material comprises fresh water (348 ml), xanthan polymer (1.2 ppb), polyanionic cellulose (PAC, 1.5 parts per barrel), an amount of sodium hydroxide to provide a pH of 10, 50 g of 2 to 4 mm sized London clay cuttings (from an outcrop in the UK), and 350 ml of water to generate one barrel equivalent (i.e., 1 g per 350 ml=1 pound per barrel (ppb)) of base mud. Four percent of a given mono-quaternary amine alcohol shale inhibitor is added to a bottle containing a sample of the well-bore material. Comparative Example A is the base sample of mud material with no shale inhibitor added. Percents are based on weight of the total composition.

Cutting Recovery Test.

The bottles are capped and rolled at 185° F. for 16 hours. After rolling, the bottles are cooled to ambient temperature (68° F. to 77° F.), and the cuttings are carefully poured onto a 2 mm sieve and gently washed with fresh water. The cuttings are blotted dry and placed in a tared boat, and the wet mass measured ("water content weight"). The cuttings are then dried overnight, and the dry mass content is measured ("recovery weight"):

recovery weight/water content weight×100=percent recovery.

Cutting Hardness Test.

Using the same procedure described above, but with a duplicate set of bottles, the cuttings isolated just before oven drying are transferred to a hardness tester, and the amount of torque (pound force-inch (lbf-in)) needed to extrude the cuttings through small apertures located in the bottom of the test cell is recorded for every full rotation. The hardness tester used is custom built, but such devices are well known, for example see: Aston, M. S.; Elliot, G. P. Water-Based Glycol Drilling Muds: Shale Inhibition Mechanisms, Paper 28818; Presented at the SPE European Petroleum Conference, London, 25-27 Oct. 1994 and Patel, A. D. Design and Development of Quaternary Amine Compounds: Shale Inhibition with Improved Environmental Profile, Paper 121737; Presented at the SPE International Symposium on Oilfield Chemistry, The Woodlands, 20-22 Apr. 2009. The maximum gauge reading of the hardness tester is 300 lbf-in. Hardness values reported in Table 1 are reported as the maximum torque (max. torque) reached and the number of turns required to reach the maximum torque.

The cutting recovery, hardness performance, and water content for Comparative Example A and Examples 5 to 8 are summarized in Table 1. Additives which are able to maintain shale hardness, and thus, provide greater resistance to extrusion are favored. Higher recovery means that the shale is rendered less reactive (e.g. dispersive) and more stable. More resistance, or recovery, means that the integrity or strength of the shale has been better preserved when exposed to the drilling fluid. Water content is determined by comparing the wet mass with the dry mass.

TABLE 1

| Com Ex | Example | Mono-quaternary Amine Alcohol | % Recovery | % Water | Hardness, max. torque (lbf-in) × no. turns |
|---|---|---|---|---|---|
| A | | none | 4 | 38.7 | 0 × 8 |
| | 5 | Example 1 | 96.1 | 34.9 | 300* × 3 |
| | 6 | Example 2 | 101.8 | 35.3 | 300* × 5 |
| | 7 | Example 3 | 75.4 | 33.3 | not tested |
| | 8 | Example 4 | 77.1 | 33.1 | 260 × 7 |

*max. torque of sample exceeds the upper limit (300 lbf-in) of the hardness tester gauge

The invention claimed is:
1. An aqueous based drilling fluid composition comprising:
i) an aqueous based continuous phase;
ii) a reactive clay or shale material; and iii) a shale hydration inhibition agent having the formula:

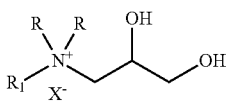

wherein
R is an alkyl group having 1 to 6 carbons,
R1 is an alkyl group having 2 to 10 carbons, and
X is chloride,
wherein the shale hydration inhibition agent is present in sufficient concentration to reduce the reactivity of the clay or shale.

2. The composition of claim 1 wherein:
R is methyl,
R1 is an alkyl group having 4 to 8 carbons.

3. The composition of claim 1 wherein the shale inhibition agent is 2,3-dihydroxypropylbutyldimethylammonium chloride; 2,3-dihydroxypropylpentyldimethyl-ammonium chloride; 2,3-dihydroxypropylhexyldimethylammonium chloride; 2,3-dihydroxypropylheptyldimethylammonium chloride; and 2,3-dihydroxypropyloctyldimethyl-ammonium chloride.

4. The composition of claim 1 further comprising one or more of a fluid loss control agent, a weighting material, a viscosifying agent, a dispersant, a lubricant, a corrosion inhibitor, a defoamer, or a surfactant.

5. The composition of claim 1 wherein the aqueous based continuous phase is fresh water, sea water, brine, mixtures of water and water soluble organic compounds, or mixtures thereof.

6. A method for reducing the reactivity of clays and shale in drilling operations comprising the use of an aqueous based drilling fluid comprising a shale hydration inhibition agent having the following formula:

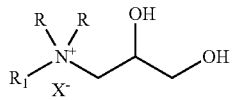

wherein
R is an alkyl group having 1 to 6 carbons,
R1 is an alkyl group having to 2 to 10 carbons, and
X is chloride,
wherein the shale hydration inhibition agent is present in sufficient concentration to reduce the reactivity of the clay or shale.

7. The method of claim 6 wherein:
R is methyl,
R1 is an alkyl group having 4 to 8 carbons.

8. The method of claim 6 wherein the shale inhibition agent is 2,3-dihydroxypropylbutyldimethylammonium chloride; 2,3-dihydroxypropylpentyldimethyl-ammonium chloride; 2,3-dihydroxypropylhexyldimethylammonium chloride; 2,3-dihydroxypropylheptyldimethylammonium chloride; and 2,3-dihydroxypropyloctyldimethyl-ammonium chloride.

9. The method of claim 6 further comprising one or more of a fluid loss control agent, a weighting material, a viscosifying agent, a dispersant, a lubricant, a corrosion inhibitor, a salt, a defoamer, or a surfactant.

10. The method of claim 6 wherein the aqueous based continuous phase is fresh water, sea water, brine, mixtures of water and water soluble organic compounds, or mixtures thereof.

* * * * *